(12) United States Patent
Dodge

(10) Patent No.: US 10,837,591 B2
(45) Date of Patent: *Nov. 17, 2020

(54) COMPOSITE ARTICLE

(71) Applicant: BASF SE, Ludwigshafen am Rhein (DE)

(72) Inventor: Jeffrey A. Dodge, Plymouth, MI (US)

(73) Assignee: BASF SE, Ludwigshafen am Rhein (DE)

( * ) Notice: Subject to any disclaimer, the term of this patent is extended or adjusted under 35 U.S.C. 154(b) by 237 days.

This patent is subject to a terminal disclaimer.

(21) Appl. No.: 16/070,064

(22) PCT Filed: Jan. 13, 2017

(86) PCT No.: PCT/US2017/013358
§ 371 (c)(1),
(2) Date: Jul. 13, 2018

(87) PCT Pub. No.: WO2017/123885
PCT Pub. Date: Jul. 20, 2017

(65) Prior Publication Data
US 2019/0017647 A1 Jan. 17, 2019
Related U.S. Application Data

(60) Provisional application No. 62/279,026, filed on Jan. 15, 2016, provisional application No. 62/279,027, filed on Jan. 15, 2016, provisional application No. 62/279,033, filed on Jan. 15, 2016, provisional application No. 62/279,029, filed on Jan. 15, 2016.

(51) Int. Cl.
*F16L 59/20* (2006.01)
*B32B 15/08* (2006.01)
(Continued)

(52) U.S. Cl.
CPC .............. *F16L 59/20* (2013.01); *B32B 15/08* (2013.01); *B32B 27/08* (2013.01); *B32B 27/308* (2013.01);
(Continued)

(58) Field of Classification Search
CPC ......... F16L 59/20; F16L 59/143; F16L 9/121; F16L 9/22; F16L 1/26; B32B 15/08;
(Continued)

(56) References Cited

U.S. PATENT DOCUMENTS

| 5,690,780 A | 11/1997 | Zharov et al. |
| 2014/0083604 A1 | 3/2014 | Gautriaud et al. |

FOREIGN PATENT DOCUMENTS

| CN | 1054136 C | 7/2000 |
| CN | 101646871 A | 2/2010 |

(Continued)

OTHER PUBLICATIONS

First Office Action from counterpart Chinese Application No. 201780006642.4 dated Jan. 10, 2020, and its English translation.
(Continued)

*Primary Examiner* — Michael C Miggins
(74) *Attorney, Agent, or Firm* — DLA Piper LLP (US)

(57) ABSTRACT

A composite article has increased pull-off strength and includes a first layer including a low surface energy polymer, a poly(meth)acrylate layer, and an epoxide layer. The poly (meth)acrylate layer is disposed on and in direct contact with the first layer. Moreover, the poly(meth)acrylate layer includes a poly(meth)acrylate that includes the reaction product of at least one (meth)acrylate that is polymerized in the presence of an organoborane initiator. The epoxide layer is disposed on and in direct contact with the poly(meth) acrylate layer. The epoxide layer includes an epoxide. The composite article has a pull-off strength of greater than zero pli measured using ASTM D4541.

14 Claims, 2 Drawing Sheets

(51) Int. Cl.
| | |
|---|---|
| *B32B 27/08* | (2006.01) |
| *B32B 27/30* | (2006.01) |
| *B32B 27/32* | (2006.01) |
| *B32B 27/40* | (2006.01) |
| *C08J 7/04* | (2020.01) |
| *F16L 59/14* | (2006.01) |
| *C09D 5/00* | (2006.01) |
| *C09D 133/10* | (2006.01) |
| *C09D 175/08* | (2006.01) |
| *F16L 9/12* | (2006.01) |
| *F16L 9/22* | (2006.01) |
| *F16L 1/26* | (2006.01) |

(52) U.S. Cl.
CPC ............. *B32B 27/32* (2013.01); *B32B 27/40* (2013.01); *C08J 7/042* (2013.01); *C09D 5/00* (2013.01); *C09D 133/10* (2013.01); *C09D 175/08* (2013.01); *F16L 9/121* (2013.01); *F16L 9/22* (2013.01); *F16L 59/143* (2013.01); *B32B 2274/00* (2013.01); *B32B 2307/304* (2013.01); *B32B 2307/714* (2013.01); *B32B 2307/748* (2013.01); *B32B 2556/00* (2013.01); *B32B 2597/00* (2013.01); *C08J 2323/06* (2013.01); *C08J 2323/12* (2013.01); *C08J 2333/04* (2013.01); *C08J 2433/10* (2013.01); *C08J 2463/00* (2013.01); *C08J 2475/08* (2013.01); *F16L 1/26* (2013.01)

(58) Field of Classification Search
CPC ....... B32B 27/08; B32B 27/308; B32B 27/32; B32B 27/40; B32B 2274/00; B32B 2307/304; B32B 2307/714; B32B 2307/748; B32B 2556/00; B32B 2597/00; C08J 7/042; C08J 2333/04; C08J 2463/00; C08J 2323/06; C08J 2323/12; C08J 2433/10; C08J 2475/08; C09D 5/00; C09D 133/10; C09D 175/08

See application file for complete search history.

(56) References Cited

FOREIGN PATENT DOCUMENTS

| | | |
|---|---|---|
| CN | 102271911 A1 | 12/2011 |
| CN | 102898988 A | 1/2012 |
| EP | 2743284 A1 | 6/2014 |
| WO | 95/22567 | 8/1995 |
| WO | 97/07171 A1 | 2/1997 |
| WO | 2008/109863 A3 | 3/2008 |
| WO | 2009/027686 A1 | 3/2009 |
| WO | 2014/028444 A2 | 2/2014 |
| WO | 2015/081068 A1 | 6/2015 |
| WO | 2015/121620 A1 | 8/2015 |

OTHER PUBLICATIONS

First Office Action from counterpart Chinese Application No. 201780006644.3 dated Dec. 25, 2019, and its English translation.
First Office Action from counterpart Chinese Application No. 201780006643.9 dated Dec. 5, 2019, and its English translation.
International Search Report and Written Opinion from corresponding International Application No. PCT/US2017/013358, dated Apr. 21, 2017.
Second Office Action from counterpart Chinese Application No. 201780006642.4 dated Aug. 14, 2020, and its English translation.
Ye, Qingxuan et al., "Adhesive", China Material Publishing House, Oct. 1999, pp. 118-120, and a brief English summary.

COMPOSITE ARTICLE

CROSS-REFERENCE TO RELATED APPLICATIONS

This application claims priority to U.S. Provisional Application No. 62/279,033, filed on Jan. 15, 2016, U.S. Provisional Application No. 62/279,026, filed on Jan. 15, 2016, U.S. Provisional Application No. 62/279,029, filed on Jan. 15, 2016, and U.S. Provisional Application No. 62/279,027, filed on Jan. 15, 2016, the contents of each of which are incorporated herein by reference in their entirety.

FIELD OF THE DISCLOSURE

The present disclosure generally relates to a composite article and a method of forming the composite article. More particularly, the composite article includes a first layer including a low surface energy polymer, a poly(meth)acrylate layer, and an epoxide layer. The composite article may be used in subsea applications such as in subsea pipelines and other subsea structures.

BACKGROUND

Domestic energy needs currently outpace readily accessible energy resources, which has forced an increasing dependence on foreign petroleum fuels, such as oil and gas. At the same time, existing energy resources are significantly underutilized, in part due to inefficient oil and gas procurement methods.

Petroleum fuels, such as oil and gas, are typically procured from subsurface reservoirs via a wellbore that is drilled by a rig. In offshore oil and gas exploration endeavors, the subsurface reservoirs are beneath the ocean floor. To access the petroleum fuels, the rig drills into the ocean floor down to approximately one to two miles beneath the ocean floor. Various subsea pipelines and structures are utilized to transport the petroleum fuels from this depth beneath the ocean floor to above the surface of the ocean and particularly to an oil platform located on the surface of the ocean. These subsea pipelines and other structures may be made of, for example, a metallic material or a combination of metallic materials. The petroleum fuels, such as the oil and gas, originating at a depth from about one to two miles beneath the ocean floor, are very hot (e.g. around 130° C.). In contrast, at this depth, the seawater is very cold (e.g. around 4° C.). This vast difference in temperature requires that the various subsea pipelines and structures be insulated to maintain the relatively high temperature of the petroleum fuels such that the fuels, such as oil and gas, can easily flow through the subsea pipelines and other subsea structures. Generally, if the oil becomes too cold due to the temperature of the seawater, it will become too viscous to flow through the pipelines and other structures and will not be able to reach the ocean surface and/or oil platform. Even in instances where the fuel may be able to flow, the fuel may flow too slowly to reach the ocean surface and/or the oil platform in an efficient amount of time for the desired operating conditions. Alternatively and/or additionally, the fuel may form waxes that detrimentally act to clog the pipelines and structures. Yet further, due to the cold temperature of the seawater, the fuel may form hydrates that detrimentally change the nature of the fuel and may also act to clog the pipelines and structures.

In other examples, pipelines may be as long as 50 miles and may be both above water and below water. While traveling over such distances, the fuel is exposed to many temperature changes. To complicate these instances, the fuel must also travel, in the pipelines, 50 miles through these temperature and pressure changes and from one to two miles beneath the ocean floor to the oil platform above the ocean surface, without losing its integrity. For example, the fuel may need to have a low viscosity to remain flowable during these distances and may need to be adequately uniform, e.g., without detrimental hydrates and waxes. Further, many existing elastomers degrade when exposed to these temperature and pressure changes below and above the ocean surface.

In view of these types of issues, subsea structures are typically constructed by coating a central tube or passageway with insulation. However, during construction, the ends of the structures typically are non-insulated to allow for welding or other connections to be made to extend the length of the structures. For that reason, the subsea structures must be patched after welding to ensure continuity of insulation and overall integrity. However, in many instances, the insulation is formed from low surface energy polymers, such as polyethylene, that are resistant to adhesion to many patches. For example, polyethylene and polypropylene tends to resist adhesion to many polymers. In an attempt to solve this problem, those of skill in the art have flame-treated the polyethylene and polypropylene to increase its surface energy and increase its ability to adhere to many polymer patches. However, even after this type of treatment, the adhesion (or peel) strength of the polyethylene and polypropylene to the patches tends to not be high enough for these types of applications and tends to not be dependable. Accordingly, there remains an opportunity for improvement.

SUMMARY OF THE DISCLOSURE

The present disclosure provides a composite article having increased pull-off strength and including a first layer including a low surface energy polymer, a poly(meth)acrylate layer, and an epoxide layer. The poly(meth)acrylate layer is disposed on and in direct contact with the first layer. Moreover, the poly(meth)acrylate layer includes a poly(meth)acrylate that includes the reaction product of at least one (meth)acrylate that is polymerized in the presence of an organoborane initiator. The epoxide layer is disposed on and in direct contact with the poly(meth)acrylate layer and includes an epoxide. The composite article has a pull-off strength of greater than zero pli measured using ASTM D4541.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 3:
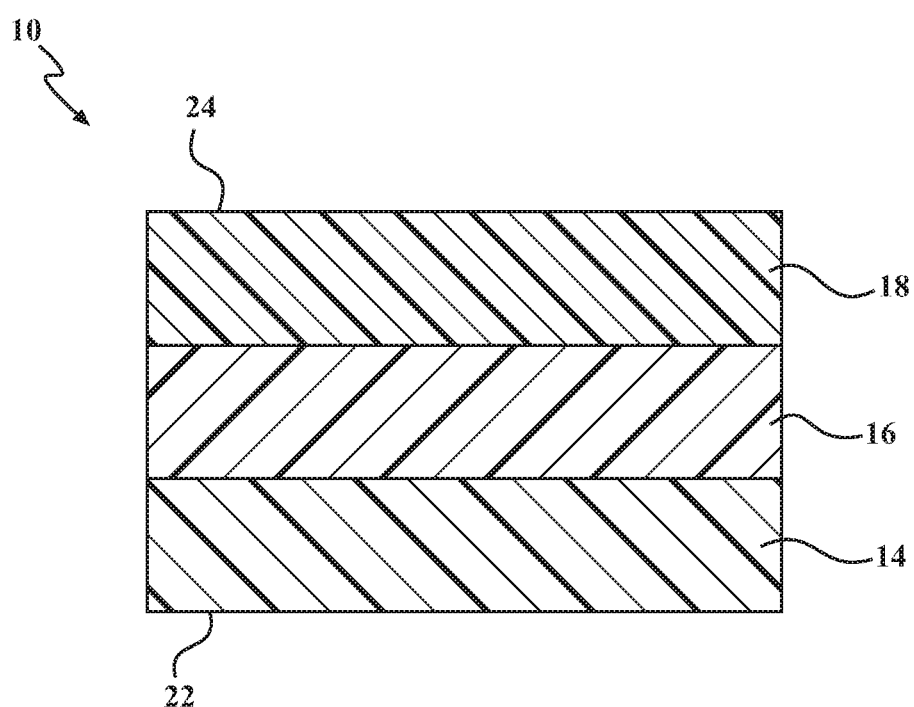
FIG. 3 is a side cross-section of one embodiment of the composite article of this disclosure.

The present disclosure includes a composite article (10). The composite article (10) typically includes three layers stacked upon one another, e.g. as shown in FIG. 3. In various embodiments, the composite article (10) includes, is, consists of, or consists essentially of, a first layer (14), a poly(meth)acrylate layer (16), and epoxide layer (18). The first layer (14) may include, be, consist of, or consist essentially of, a polymer that has a low surface energy. The first layer (14) may be described as a polymer layer. The poly(meth)acrylate layer may include, be, consist of, or consist essentially of, a poly(meth)acrylate. The epoxide layer (18) may include, be, consist of, or consist essentially of, an epoxide or an epoxide-polyurethane hybrid. The poly(meth)acrylate layer (16) and the epoxide layer (18) may each be described as additional layers, e.g. as second or third layers, etc. In various embodiments, the first layer (14) is described as a first outermost layer (22). In other embodiments, the epoxide layer (18) is described as a second (e.g. outermost) layer (24). Each of these layers is described in greater detail below. The terminology "consist essentially of" above describes embodiments that may be free of extraneous polymers or monomers that are reacted to form polymers. Relative to the composite article (10) itself, the terminology "consists essentially of" may describe embodiments that are free of additional layers, e.g. as whole layers or as partial layers.

The composite article (10) has increased pull-off strength e.g. as compared to a composite article (10) that is free of the acrylate layer and/or the epoxide layer (18). In various embodiments, the composite article (10) has a pull-off strength of greater than 0, 5, 10, 15, 20, 25, 50, 75, 100, 125, 150, 175, 200, 225, 250, 275, etc. pli, measured using ASTM 4541. In other embodiments, the composite article (10) has a pull-off strength of at least 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000, pli, measured using ASTM 4541. In still other embodiments, the composite article (10) has a pull-off strength of from 300 to 1500, from 350 to 1450, from 400 to 1400, from 450 to 1350, from 500 to 1300, from 550 to 1250, from 600 to 1200, from 650 to 1150, from 700 to 1100, from 750 to 1050, from 800 to 1000, from 850 to 950, or from 900 to 950, pli, measured using ASTM 4541. In further embodiments, the composite article (10) has a pull-off strength that has a minimum value chosen from one of the values above and a maximum value also chosen from one of the values above. In alternative embodiments, all values and ranges of values between the aforementioned values are hereby expressly contemplated.

In one embodiment, pull-off strength is determined based on ~100% cohesive failure of the bonding layer, e.g. the poly(meth)acrylate (bonding) layer (16). In this embodiment, the poly(meth)acrylate layer (16) is typically the weakest link. In another embodiment, pull-off strength is determined based on 80% cohesive failure of the poly(meth) acrylate (bonding) layer (16) and 20% Glue failure, which refers to clean separation ("Adhesive" failure) between the glue used to adhere the test "dolly" to the epoxide layer (18) and the epoxide layer (18) itself, e.g. as shown in FIG. 4 and as set forth in ASTM 4541. In still another embodiment, pull-off strength is determined based on 100% adhesive failure between the epoxide layer (18) and the first layer (14), e.g. polypropylene. This is indicative of clean separation between the epoxide layer (18) and the first layer (14). Additional description of these types of pull-off measurements are set forth in the Examples herein.

First Layer:

The first layer (14) of the composite article (10) may include, be, consist essentially of, or consist of, a low surface energy polymer. The terminology "low surface energy" typically describes a polymer that has a surface energy of less than about 40 mN/m (milli-Newtons per meter), as determined at 20° C. by ASTM D7490-13.

In various embodiments, the low surface energy polymer is chosen from polyethylene, polypropylene, and combinations thereof. In still other embodiments, the low surface energy polymer is chosen from those set forth immediately below and combinations thereof.

| Name | CAS Ref-No. | Approximate Surface Free Energy (SFE) at 20° C. in mN/m |
|---|---|---|
| Polystyrene PS | 9003-53-6 | 40.7 |
| Polyamide-12 PA-12 | 24937-16-4 | 40.7 |
| Poly-a-methyl styrene PMS (Polyvinyltoluene PVT) | 9017-21-4 | 39 |
| Polyethylacrylate PEA | 9003-32-1 | 37 |
| Polyvinyl fluoride PVF | 24981-14-4 | 36.7 |
| Polyvinylacetate PVA | 9003-20-7 | 36.5 |
| Polyethylmethacrylate PEMA | 9003-42-3 | 35.9 |
| Polyethylene-linear PE | 9002-88-4 | 35.7 |
| Polyethylene-branched PE | 9002-88-4 | 35.3 |
| Polycarbonate PC | 24936-68-3 | 34.2 |
| Polyisobutylene PIB | 9003-27-4 | 33.6 |
| Polytetramethylene oxide PTME (Polytetrahydrofurane PTHF) | 25190-06-1 | 31.9 |
| Polybutylmethacrylate PBMA | 25608-33-7 | 31.2 |
| Polychlorotrifluoroethylene PCTrFE | 25101-45-5 | 30.9 |
| Polyisobutylmethacrylate PIBMA | 9011-15-8 | 30.9 |
| Poly(t-butylmethacrylate) PtBMA | — | 30.4 |
| Polyvinylidene fluoride PVDF | 24937-79-9 | 30.3 |
| Polypropylene-isotactic PP | 25085-53-4 | 30.1 |
| Polyhexylmethacrylate PHMA | 25087-17-6 | 30 |
| Polytrifluoroethylene P3FEt/PTrFE | 24980-67-4 | 23.9 |
| Polytetrafluoroethylene PTFE | 9002-84-0 | 20 |
| Polydimethylsiloxane PDMS | 9016-00-6 | 19.8 |

The first layer (14) may be an outermost layer of the composite article (10) or may be an interior layer of a larger article. If an outermost layer, the first layer (14) is free of contact with any other layer on an external side and faces the environment on that side.

The first layer (14) is not limited to any particular dimensions or thickness. In various embodiments, the first layer (14) has a thickness of from 0.1 inches to 1 foot or more, wherein 1 inch is equal to 2.54 centimeters, such as 0.375 inches (about 1 cm). In various embodiments, the thickness is from 3 to 8, from 3.5 to 7.5, from 4 to 7, from 4.5 to 6.5, from 5 to 6, or from 5.5 to 6, inches. In various non-limiting embodiments, all values and ranges of values between the aforementioned values are hereby expressly contemplated.

Poly(Meth)Acrylate Layer:

The composite article (10) also includes the poly(meth) acrylate layer (16). The poly(meth)acrylate layer (16) is disposed on and in direct contact with the first layer (14). In other words, there is no intermediate layer or tie layer disposed between the poly(meth)acrylate layer (16) and the first layer (14). The poly(meth)acrylate layer (16) may be include, consist essentially of, or consist of, a poly(meth) acrylate.

The poly(meth)acrylate itself may be, include, consist essentially of, or consist of, the reaction product of at least one (meth)acrylate that is polymerized in the presence of an organoborane initiator. The terminology "consist essentially of" describes an embodiment that is free of polymers or monomers that are reacted to form polymers. The at least one (meth)acrylate may be a single (meth)acrylate, two (meth)acrylates, three (meth)acrylates, etc, each of which may independently be a methacrylate or any acrylate monomer capable of polymerization. The terminology "(meth)" describes that the acrylate and/or polyacrylate may have methacrylate functionality (and be a type of methacrylate) or may be free of methacrylate functionality.

The (meth)acrylate may be described as an acrylate that has 3 to 20 carbon atoms, e.g. 3, 4, 5, 6, 7, 8, 9, 10, 11, 12, 13, 14, 15, 16, 17, 18, 19, or 20, carbon atoms or any range of values. In other embodiments, the (meth)acrylate is chosen from hydroxypropyl methacrylate, 2-ethylhexylacrylate, acrylic acid, and combinations thereof. In further embodiments, the (meth)acrylate is chosen from 2-ethylhexylacrylate, 2-ethylhexylmethacrylate, methylacrylate, methylmethacrylate, butylacrylate, ethylacrylate, hexylacrylate, isobutylacrylate, butylmethacrylate, ethylmethacrylate, isooctylacrylate, decylacrylate, dodecylacrylate, vinyl acrylate, acrylic acid, methacrylic acid, neopentylglycol diacrylate, neopentylglycoldimethacrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, glycidyl acrylate, glycidyl methacrylate, allyl glycidyl ether, allyl acrylate, allyl methacrylate, stearyl acrylate, stearyl methacrylate, tetrahydrofurfuryl acrylate, 2-hydroxyethyl acrylate, 2-hydroxyethyl methacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, N-vinyl pyrrolidone, N-vinyl caprolactam, N-isopropyl acrylamide, N,N-dimethyl acrylamide, t-octyl acrylamide, cyanotethylacrylates, diacetoneacrylamide, N-vinyl acetamide, N-vinyl formamide, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, and combinations thereof. The at least one (meth)acrylate may include only acrylate or methacrylate functionality. Alternatively, the at least one (meth)acrylate may include both acrylate functionality and methacrylate functionality.

In various embodiments, the at least one (meth)acrylate is chosen from monofunctional acrylates and methacrylate esters and substituted derivatives thereof such as amino, cyano, chloro, and silane derivatives as well as blends of substituted and unsubstituted monofunctional acrylate and methacrylate esters. In other embodiments, the at least one (meth)acrylate is chosen from lower molecular weight methacrylate esters and amides such as methyl methacrylate, ethyl methacrylate, butyl methacrylate, methoxy ethyl methacrylate, cyclohexyl methacrylate, tetrahydrofurfuryl methacrylate, N,N-dimethyl methacrylamide and blends thereof. In still other embodiments, the at least one (meth)acrylate is chosen from methyl acrylate, ethyl acrylate, isobornyl methacrylate, butyl acrylate, n-octyl acrylate, 2-ethylhexyl acrylate, 2-ethylhexyl methacrylate, decylmethacrylate, dodecyl methacrylate, tert-butyl methacrylate, acrylamide, N-methyl acrylamide, diacetone acrylamide, N-tert-butyl acrylamide, N-tert-octyl acrylamide, N-decyl methacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like. In further embodiments, the at least one (meth)acrylate is chosen from alkyl acrylates having 4 to 10 carbon atoms in the alkyl group, such as blends of methyl methacrylate and butylacrylate, In even further embodiments, the at least one (meth)acrylate is chosen from hexanedioldiacrylate, ethylene glycol dimethacrylate, ethylene glycol diacrylate, triethylene glycol dimethacrylate, polyethylene glycol diacrylate, tetraethylene glycol di(meth)acrylate, glycerol diacrylate, diethylene glycol dimethacrylate, pentaerythritol triacrylate, trimethylolpropane trimethacrylate, as well as other polyether diacrylates and dimethacrylates.

In further embodiments, the at least one (meth)acrylate has the formula:

wherein R and R' are each hydrogen or organic radicals, and X is oxygen. Blends of acrylic monomers may also be used. The at least one (meth)acrylate may be monofunctional, polyfunctional or a combination thereof.

The at least one (meth)acrylate is polymerized in the presence of an organoborane initiator to form the poly(meth)acrylate. This polymerization typically results in the poly(meth)acrylate including amounts of boron that remain from the organoborane initiator, e.g. in the form of oxidized by-products. In other words, the organoborane initiator includes boron atoms. After reaction to form the poly(meth)acrylate, some of the boron atoms may remain in the poly(meth)acrylate. As just one example, the presence of the boron atoms may differentiate the poly(meth)acrylate formed in the presence of the organoborane initiator from other poly(meth)acrylates formed using different initiation mechanisms or different initiators. In various embodiments, the amount of boron atoms in the poly(meth)acrylate may be from 10 to 10,000,000, from 10 to 1,000,000, from 10 to 100,000, from 100 to 10,000, from 100 to 5,000, from 500 to 5,000, or from 500 to 2,000, parts by weight per one million parts by weight (ppm) of the at least on (meth)acrylate or of the poly(meth)acrylate. In alternative embodiments, all values and ranges of values between the aforementioned values are hereby expressly contemplated.

The organoborane initiator may be any organoborane compound known in the art capable of generating free radicals. In various embodiments, the organoborane initiator includes trifunctional boranes which include the general structure:

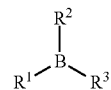

wherein each of $R^1$-$R^3$ independently has from 1 to 20 carbon atoms and wherein each of $R^1$-$R^3$ independently comprise one of an aliphatic hydrocarbon group and an aromatic hydrocarbon group. The aliphatic and/or aromatic hydrocarbon groups may be linear, branched, and/or cyclic. Suitable examples of the organoborane include, but are not limited to, tri-methylborane, tri-ethylborane, tri-n-butylborane, tri-n-octylborane, tri-sec-butylborane, tri-dodecylborane, phenyldiethylborane, and combinations thereof. In one embodiment, the organoborane includes tri-n-butylborane.

The organoborane initiator may be derived from decomplexation of an air-stable complex of an organoborane compound and an organonitrogen compound. In one embodiment, the organoborane initiator is further defined as an organoborane-organonitrogen complex. Suitable organoborane initiators include, but are not limited to, organoborane-amine complexes, organoborane-azole complexes, organoborane-amidine complexes, organoborane-heterocyclic nitrogen complexes, amido-organoborate complexes, and combinations thereof. In one embodiment the organoborane-amine complex is or includes a trialkylborane-amine complex. In one embodiment, the organoborane initiator is further defined as an organoborane-amine complex. A typical organoborane-amine complex includes a complex formed between an organoborane and a suitable amine that renders the organoborane-amine complex stable at ambient conditions. Any organoborane-amine complex known in the art may be used. Typically, the organoborane-amine complex is capable of initiating polymerization or cross-linking of the radical curable organic compound through introduction of an amine-reactive compound, and/or by heating. That is, the organoborane-amine complex may be destabilized at ambient temperatures through exposure to suitable amine-reactive compounds. Heat may be applied if needed or desired. The organoborane-amine complex typically has the formula:

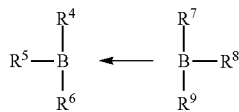

wherein B represents boron. Additionally, each of $R^4$, $R^5$, and $R^6$ is typically independently selected from the group of a hydrogen atom, a cycloalkyl group, a linear or branched alkyl group having from 1 to 12 carbon atoms in a backbone, an alkylaryl group, an organosilane group, an organosiloxane group, an alkylene group capable of functioning as a covalent bridge to the boron, a divalent organosiloxane group capable of functioning as a covalent bridge to the boron, and halogen substituted homologues thereof, such that at least one of $R^4$, $R^5$, and $R^6$ includes one or more silicon atoms, and is covalently bonded to boron. Further, each of $R^7$, $R^8$, and $R^9$ typically yields an amine compound or a polyamine compound capable of complexing the boron. Two or more of $R^4$, $R^5$, and $R^6$ and two or more of $R^7$, $R^8$, and $R^9$ typically combine to form heterocyclic structures, provided a sum of the number of atoms from $R^4$, $R^5$, $R^6$, $R^7$, $R^8$, and $R^9$ does not exceed 11.

Additionally, any amine known in the art may, in theory, be used to form the organoborane-amine complex. Typically, the amine includes at least one of an alkyl group, an alkoxy group, an imidazole group, an amidine group, an ureido group, and combinations thereof. Particularly suitable amines include, but are not limited to, 1,3 propane diamine, 1,6-hexanediamine, methoxypropylamine, pyridine, isophorone diamine, and combinations thereof.

The organoborane initiator may be used in any amount to form the poly(meth)acrylate. Typically, the organoborane initiator is used in an amount equivalent to of from 0.01 to 95, more typically of from 0.1 to 80, even more typically of from 0.1 to 30, still more typically of from 1 to 20, and most typically of from 1 to 15, parts by weight per 100 parts by weight of the poly(meth)acrylate. The amounts of the organoborane initiator typically depend upon a molecular weight and functionality of the organoborane initiator and the presence of other components such as fillers. In various embodiments, the amount used is based on percent boron in the reaction mixture, calculated by the weight of the active ingredients (e.g. acrylic monomers).

In addition to the organoborane initiator, a reactive compound (e.g. an amine reactive compound), such as a decomplexer, may also be utilized or may be omitted. If omitted, the For example, an organoborane-organonitrogen complex (acting as the organoborane initiator) may interact with a nitrogen-reactive compound to initiate polymerization or cross-linking of the at least one (meth)acrylate. This allows the at least one (meth)acrylate to polymerize at low temperatures and with decreased reaction times. Typically this occurs when the nitrogen-reactive compound is mixed with the organoborane-organonitrogen complex and exposed to an oxygenated environment at temperatures below a dissociation temperature of the organoborane-organonitrogen complex, including room temperature and below. The nitrogen-reactive compound may be or include any nitrogen-reactive compound known in the art and can be delivered as a gas, liquid, or solid. In one embodiment, the nitrogen-reactive compound includes free radical polymerizable groups or other functional groups such as a hydrolyzable group, and can be monomeric, dimeric, oligomeric or polymeric. In various embodiments, the organoborane-amine complex includes a trialkylborane-amine complex. In other embodiments, the amine-reactive compound is chosen from acids, anhydrides, and combinations thereof.

In various embodiments, the nitrogen-reactive compound is chosen from the group of an acid, an anhydride, and combinations thereof. In other embodiment, the nitrogen-reactive compound includes nitrogen-reactive groups, such as amine-reactive groups. It is contemplated that the nitrogen-reactive groups may be derived from the organoborane-organonitrogen complex and/or any additives present. The nitrogen-reactive compound may be selected from the group of Lewis acids, carboxylic acids, carboxylic acid derivatives, carboxylic acid salts, isocyanates, aldehydes, epoxides, acid chlorides, sulphonyl chlorides, iodonium salts, anhydrides, and combinations thereof. In one embodiment, the amine-reactive compound is selected from the group of isophorone diisocyanate, hexamethylenediisocyanate, toluenediisocyanate, methyldiphenyldiisocyanate, acrylic acid, methacrylic acid, 2-hydroxyethylacrylate, 2-hydroxymethylacrylate, 2-hydroxypropylacrylate, 2-hydroxypropylmethacrylate, methacrylic anhydride, undecylenic acid, citraconic anhydride, polyacrylic acid, polymethacrylic acid, and combinations thereof. In yet another embodiment, the nitrogen-reactive compound is selected from the group of oleic acid, undecylenic acid, polymethacrylic acid, stearic acid, citric acid, levulinic acid, and 2-carboxyethyl acrylate, and combinations thereof. In another embodiment, the nitrogen-reactive compound may include, but is not limited to, acetic acid, acrylic acid, methacrylic acid, methacrylic anhydride, undecylenic acid, oleic acid, an isophorone diisocyanate monomer or oligomer, a hexamethylenediisocyanate monomer, oligomer, or polymer, a toluenediisocyanate monomer, oligomer, or polymer, a methyldiphenyldiisocyanate monomer, oligomer, or polymer, methacryloylisocyanate, 2-(methacryloyloxy)ethyl acetoacetate, undecylenic aldehyde, dodecyl succinic anhydride, compounds capable of generating nitrogen-reactive groups when exposed to ultraviolet radiation such as photoacid generators and iodonium salts including $[SbF_6]^-$ counter ions. With such ultraviolet photoacid generators, a photosensitizing compound such as isopropylthioxanthone may be included.

In various embodiments, the decomplexer includes at least one free radically polymerizable group and at least one nitrogen-reactive group in the same molecule. Examples of useful decomplexers include the following: $(A)_a\text{-}Y\text{---}(B)_b$ wherein "A" is a group that is capable of forming a covalent bond with an acrylate, "B" is a group that is capable of forming a covalent bond with a nitrogen (e.g. amine) portion of the organoborane-organonitrogen complex, "Y" is a polyvalent organic linking group; "a" represents the number of free radically polymerizable groups, and "b" represents the number of nitrogen-reactive groups.

Group "A" may include free radically polymerizable groups such as alkene groups. The alkene group may be unsubstituted or substituted or part of a cyclic ring structure. Substituted alkenes include, for example, those alkenes having alkyl aryl group substitution. Typical alkenes are those having terminal unsubstituted double bonds such as allyl groups. Other alkenes are styryls and acrylics.

Group "B" may include an isocyanate group. Typically, the value of each of "a" and "b" is at least one. Preferably, the sum of "a" and "b" is less than or equal to six, more preferably less than or equal to four, most preferably two.

Group "Y" may include a variety of different chemical structures depending on the reagents used to prepare the decomplexer. The decomplexer may include the reaction product of a hydroxyl compound containing a free radically polymerizable group and a polyisocyanate.

The decomplexer/nitrogen-reactive compound may be used in an amount equivalent to of from 0.1 to 95, more typically of from 0.1 to 90, and most typically of from 1 to 20, parts by weight per 100 parts by weight of the poly(meth)acrylate. The amount of the nitrogen-reactive compound may depend upon a molecular weight and functionality of the nitrogen-reactive compound and the presence of other components such as fillers. In another embodiment, the nitrogen-reactive compound is typically used in an amount wherein a molar ratio of nitrogen-reactive groups to nitrogen groups in the poly(meth)acrylate is of from 0.1 to 100, more typically from 0.5 to 50, and most typically from 0.8 to 20.

In various embodiments, the poly(meth)acrylate, the at least one (meth)acrylate, the organoborane initiator, the decomplexer, etc. may each be independently as described in U.S. Pat. No. 5,990,036, which is expressly incorporated herein in its entirety in various non-limiting embodiments.

The poly(meth)acrylate layer (16) is not limited to any particular dimensions or thickness. In various embodiments, the poly(meth)acrylate layer (16) has a minimum wet film thickness of 0.050, 0.055, 0.060, 0.065, 0.070, 0.075, 0.080, 0.085, 0.090, 0.095, 0.100, inches, etc. In various embodiments, there is no maximum thickness per se. However, if the thickness is not enough then oxygen can quench the active compounds and grafting is minimized or won't occur. In some embodiments, the wet film thickness is from 0.050 to 0.5 or from 0.050 to 0.1, inches, wherein 1 inch is equal to 2.54 centimeters. In various non-limiting embodiments, all values and ranges of values between the aforementioned values are hereby expressly contemplated.

Epoxide Layer:

Referring now to the epoxide layer (18), the epoxide layer (18) is disposed on and in direct contact with the poly(meth)acrylate layer (16). In other words, there is no intermediate layer or tie layer disposed between the poly(meth)acrylate layer (16) and the epoxide layer (18). The epoxide layer (18) may be, include, consist essentially of, or consist of, an epoxide, an epoxide elastomer, and/or an epoxy-polyurethane hybrid. The epoxide layer (18), and the epoxide itself, are typically formed from an epoxide composition.

In one embodiment, the epoxide is further defined as an epoxide elastomer. The epoxide elastomer is typically the polymerization product of an epoxide composition. In other embodiments, the epoxide is further defined as an epoxy-polyurethane hybrid. The epoxy-polyurethane hybrid is typically the reaction product of an isocyanate component and an epoxide composition. Each is described in greater detail below.

Epoxy Composition:

The epoxide composition may include an epoxy compound and a hardener. Alternatively, the epoxide composition may be formed from the reaction of an epoxy compound (such as an epoxy resin) and a hardener. The epoxy resin may be present in a composition and may be chosen from epoxy resins which are liquid and insoluble in water, and which have low viscosity and little water permeability. In various embodiments, the epoxy resin is a glycidyl ether type epoxy resin including bisphenol A type, bisphenol AD type, novolak type, bisphenol F type, and brominated bisphenol A type, special epoxy resins such as glycidyl ester type epoxy resins, glycidyl amine type epoxy resins, and heterocyclic epoxy resins, and various modified epoxy resins. In various embodiments, epoxy resins useful herein include liquids, solids, and mixtures thereof. For example, the epoxy resins can also be described as polyepoxides such as monomeric polyepoxides (e.g. the diglycidyl ether of bisphenol A, diglycidyl ether of bisphenol F, diglycidyl ether of tetrabromobisphenol A, novolac-based epoxy resins, and tris-epoxy resins), higher molecular weight resins (e.g. the diglycidyl ether of bisphenol A advanced with bisphenol A) or polymerized unsaturated monoepoxides (e.g. glycidyl acrylates, glycidyl methacrylate, allyl glycidyl ether, etc.) to homopolymers or copolymers. In various embodiments, epoxy compounds include, on the average, at least one pendant or terminal 1,2-epoxy group (i.e., vicinal epoxy group) per molecule. Solid epoxy resins that may be used can include or be based on Bisphenol A. For example, a suitable epoxy resin is diglycidyl ether of bisphenol A Dow Chemical DER 664 UE solid epoxy.

The bisphenol type epoxy resins can be produced via reaction between 2,2-bis(4-hydroxyphenyl)propane, i.e., bisphenol A and haloepoxides such as epichlorohydrin or beta-methylepichlorohydrin. Bisphenol AD type epoxy resins can be produced via reaction between 1,1-bis(4-hydroxyphenyl)ethane, i.e., bisphenol AD and haloepoxides such as epichlorohydrin or beta-methylepichlorohydrin. Bisphenol F type epoxy resins can be produced through reaction between bis(4-hydroxyphenyl)methane i.e. bisphenol F and haloepoxides such as epichlorohydrin or beta-methylepichlorohydrin.

A modifying resin may also be blended with the epoxy resin and chosen from a coumarone-indene polymer resin, a dicyclopentadiene polymer resin, an acrylonitrile modified polyvinyl chloride resin, an amino terminated acrylonitrile-butadiene copolymer resin, and an epoxy terminated polybutadiene resin.

The hardener is typically capable of cross-linking with epoxy groups on the epoxy resin. Any hardener, e.g., suitable for a 2K epoxy, may be used. Typical hardeners include polymeric amines (polyamines) and polymeric amides (polyamides) (including, e.g., polyamidoamines), low molecular weight amines, and combinations thereof.

In various embodiments, an amine is chosen from cycloaliphatic polyamine, an aliphatic/aromatic polyamine, and an amine adduct. The amine may be a linear aliphatic polyamine, aromatic polyamine, acid anhydride, imidazole, or an amine chosen from a cycloaliphatic polyamine, an aliphatic/aromatic polyamine, and an amine adduct. In various embodiments, the amine is isophorone diamine and/or m-xylylene diamine. In additional embodiments, the amine adduct is an adduct of a polyamine with an epoxy or similar resin. More particularly, the amine adducts can include polyamines such as m-xylylene diamine and isophorone diamine to which various epoxy resins such as bisphenol A epoxy resins can be added. The epoxy resins which can form adducts with the polyamines are as described above.

In various embodiments, the amine includes a polyether-amine-epoxy adduct, that is, a reaction product of a stoichiometric excess of an amine prepolymer with an epoxy resin. The amine may be any amine prepolymer that has at least two amine groups in order to allow cross-linking to take place. The amine prepolymer may include primary and/or secondary amine groups, and typically includes primary amine groups. Suitable amine prepolymers include polyether diamines and polyether triamines, and mixtures thereof. Polyether triamine is typical in one embodiment. The polyether amines may be linear, branched, or a mixture. Branched polyether amines are typical in one embodiment. Any molecular weight polyetheramine may be used, with weight average ($M_w$) molecular weights in the range of 200-6000 or above being suitable. Weight average molecular weights may be above 1000, or more preferably above 3000. Weight average molecular weights of 3000 or 5000 are typical in various embodiments. Suitable commercially available polyetheramines include those sold by Huntsman under the Jeffamine trade name. Suitable polyether diamines include Jeffamines in the D, ED, and DR series. These include Jeffamine D-230, D-400, D-2000, D-4000, HK-511, ED-600, ED-900, ED-2003, EDR-148, and EDR-176. Suitable polyether triamines include Jeffamines in the T series. These include Jeffamine T-403, T-3000, and T-5000. Polyether triamines are typical in various embodiments, and a polyether triamine of molecular weight about 5000 (e.g., Jeffamine T-5000) is most typical in another embodiment. The equivalents of any of the above may also be used in partial or total replacement.

In further embodiments, the epoxy composition includes 5 to 30 parts by weight of the epoxy compound, 0 to 35 parts by weight of the modifying resin, and a balance of the amine curing agent, per 100 parts by weight of the composition.

The epoxide composition may also include one or more curing accelerators (catalysts). The curing accelerator typically functions by catalyzing reaction of the epoxy resin and the amine (or hardener). The curing accelerator may include a tertiary amine, such as 2,4,6-tris(dimethylamino-methyl) phenol, available from Air Products under the name Ancamine K54. Other amines are described in U.S. Pat. No. 4,659,779 which is expressly incorporated herein by reference in its entirety in various non-limiting embodiments.

In various embodiments, the reaction of the epoxy resin and the amine is as follows:

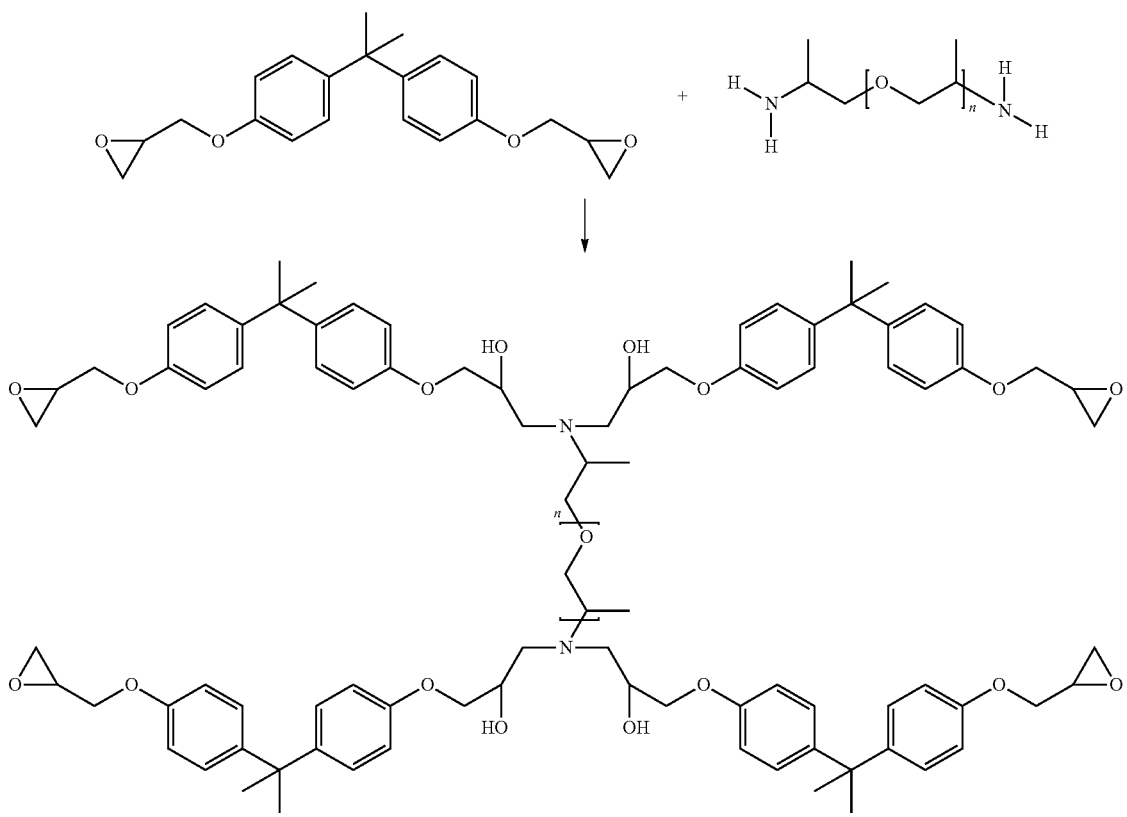

wherein n is from 5 to 75.

The epoxide layer (18) is not limited to any particular dimensions or thickness. In various embodiments, the epoxide layer (18) has a wet film thickness of from 0.010 to 0.5, from 0.025 to 0.5, from 0.050 to 0.5, from 0.025 to 0.1, from 0.025 to 0.05, from 0.05 to 0.1, or from 0.05 to 0.5, inches, wherein 1 inch is equal to 2.54 centimeters. In various non-limiting embodiments, all values and ranges of values between the aforementioned values are hereby expressly contemplated.

Once the epoxy compound is formed, two additional reactions may take place to form either the epoxy elastomer and/or the epoxy-polyurethane hybrid.

Formation of the Epoxy Elastomer:

To form the epoxy elastomer, the epoxy compound (such as the one formed above) is typically reacted with itself in a self-polymerization reaction in the presence of a catalyst and optionally heat. For example, terminal or pendant epoxy groups on the epoxy compound may participate in a ring-opening reaction to cross-link molecules of the epoxy compound together to form a larger compound, e.g. having —OH functionality.

The catalyst typically has more than one non-tertiary amino group per molecule, the amino group being a primary and/or a secondary amino group, and is typically solid or liquid at ambient temperatures. Suitable liquid polyamine curing agents include aromatic polyamines, e.g. ortho, meta, or para xylylene diamines; aliphatic polyamines, e.g. ethylene diamine, diethylene triamine and trimethylhexamethylene diamine; cycloaliphatic polyamines, e.g. 1-amino-3-amino methyl-3,5,5-trimethylcyclocohexane (isophorone diamine), 3,3'-dimethyl-4,4' diaminodicyclohexylmethane, 4,4'-diaminodicyclohexylmethane and N-cyclohexyl n-propylene diamine (cyclohexylpropylene diamine) and ortho, meta or para bis(aminomethyl)cyclohexane; and polyamides. Typically liquid polyamine curing agents are cycloaliphatic polyamines, in particular those having two primary amino groups, such as isophorone diamine. If desired, liquid polyamine curing agents can be diluted with diluents, such as benzyl alcohol, dibutylphthalate, furfuryl alcohol or pine oil.

Formation of the Epoxy-Polyurethane Hybrid:

The epoxy-polyurethane hybrid is typically formed by reaction of —OH groups on the epoxy compound with an isocyanate and/or by reaction of —OH groups on the epoxy elastomer with an isocyanate component. For example, the aforementioned epoxy compound may be reacted with an isocyanate component instead of undergoing the self-polymerization reaction described above. Alternatively, after the self-polymerization reaction, the epoxy elastomer may still include —OH groups. If so, then these —OH groups on the epoxy elastomer may reaction with an isocyanate component. In both scenarios, an epoxy-polyurethane hybrid may be formed.

The isocyanate component may be, include, consist essentially of, or consist of, any isocyanate known in the art, e.g. aliphatic isocyanates, aromatic isocyanates, polymeric isocyanates, or combinations thereof. The isocyanate component may be, include, consist essentially of, or consist of, more than one different isocyanate, e.g., polymeric diphenylmethane diisocyanate and 4,4'-diphenylmethane diisocyanate. In various embodiments, the isocyanate is chosen from diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

In various embodiments, the isocyanate component typically includes, but is not limited to, isocyanates, diisocyanates, polyisocyanates, and combinations thereof. In one embodiment, the isocyanate component includes an n-functional isocyanate. In this embodiment, n is a number typically from 2 to 5, more typically from 2 to 4, still more typically of from 2 to 3, and most typically about 2. It is to be understood that n may be an integer or may have intermediate values from 2 to 5. The isocyanate component typically includes an isocyanate selected from the group of aromatic isocyanates, aliphatic isocyanates, and combinations thereof. In another embodiment, the isocyanate component includes an aliphatic isocyanate such as hexamethylene diisocyanate (HDI), dicyclohexyl-methylene-diisocyanate ($H_{12}$MDI), isophorone-diisocyanate, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component can include an aromatic isocyanate. If the isocyanate component includes an aromatic isocyanate, the aromatic isocyanate typically corresponds to the formula $R'(NCO)_z$ wherein R' is aromatic and z is an integer that corresponds to the valence of R'. Typically, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethyolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof.

The isocyanate component may be an isocyanate prepolymer. The isocyanate pre-polymer may be a reaction product of an isocyanate and a polyol and/or a polyamine. The isocyanate used in the pre-polymer can be any isocyanate as described above. The polyol used to form the pre-polymer may be any polyol having a number average molecular weight of 400 g/mol or greater. For example, polyetherols, polyesterols, and combinations thereof can be used.

For purposes of the present disclosure, the term "polyol" is used to describe a molecule that includes one or more hydroxyl functional groups, typically at least two hydroxyl functional groups and have a number average molecular weight of greater than 400 g/mol. In various embodiments, the one or more polyols has an —OH functionality of 2, 3, 4, 5, 6, 7, or 8. In other embodiments, each of the one or more polyols may independently have a nominal hydroxy functionality of from about 2 to about 4, alternatively from about 2.2 to about 3.7, and alternatively of from about 2.5 to about 3.5. Compounds that have only one hydroxyl group may be alternatively described as chain terminators. Similarly, compounds that have only two hydroxyl groups may be alternatively described as chain extenders.

The one or more polyols may each independently be polyether polyols, polyester polyols, polyether/ester polyols, and combinations thereof. The one or more polyols may each independently have a number average molecular weight of from about 400 to about 15,000, alternatively from about 450 to about 7,000, and alternatively from about 600 to about 5,000, g/mol. In another embodiment, each of the one or more polyols independently has a hydroxyl number of from about 20 to about 1000, alternatively from about 30 to about 800, alternatively from about 40 to about 600, alternatively from about 50 to about 500, alternatively from about 55 to about 450, alternatively from about 60 to about 400, alternatively from about 65 to about 300, mg KOH/g.

In various embodiments, the polyol is chosen from conventional polyols, including, but not limited to, biopolyols, such as soybean oil, castor-oil, soy-protein, rapeseed oil, etc., derivatives thereof, and combinations thereof. Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyol copolymers include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, aromatic polyester polyols, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

In addition, lower molecular weight hydroxyl-functional compounds may also be utilized such as any chain extenders known in the art, ethylene glycol, diethylene glycol, propylene glycol, dipropylene glycol, butane diol, glycerol, trimethylolpropane, triethanolamine, pentaerythritol, sorbitol, and combinations thereof.

Referring back, the isocyanate component typically has an NCO content of from 3 to 50, alternatively from 3 to 33, alternatively from 18 to 30, weight percent when tested in accordance with DIN EN ISO 11909, and a viscosity at 25° C. of from 5 to 2000, alternatively from 100 to 1000, alternatively from 150 to 250, alternatively from 180 to 220, mPa·sec when tested in accordance with DIN EN ISO 3219.

In various embodiments the isocyanate component is, includes, consists essentially of, or consists of, monomeric and polymeric isocyanate. For example, in one embodiment the isocyanate component includes polymeric diphenylmethane diisocyanate and 4,4'-diphenylmethane diisocyanate, and has an NCO content of about 33.5 weight percent. Alternatively, in another embodiment, the isocyanate component includes polymeric diphenylmethane diisocyanate and 4,4'-diphenylmethane diisocyanate, and has an NCO content of about 31.3 weight percent.

The isocyanate component is typically reacted in an amount of from 10 to 90, alternatively from 20 to 75, alternatively from 30 to 60, percent by weight based on the total weight of the epoxy compound and/or the epoxy elastomer. The amount of the isocyanate component reacted may vary outside of the ranges above, but is typically both whole and fractional values within these ranges. Further, it is to be appreciated that more than one isocyanate may be included in the isocyanate component, in which case the total amount of all isocyanates included is within the above ranges.

One or more catalysts may be utilized to form the epoxide-polyurethane hybrid and to catalyze the reaction between the isocyanate component and the isocyanate reactive groups of the epoxide or epoxy elastomer. It is to be appreciated that the catalyst is typically not consumed in the exothermic reaction between the isocyanate component and the isocyanate reactive groups. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g., amine catalysts in dipropylene glycol; blowing catalysts, e.g., bis(dimethylaminoethyl)ether in dipropylene glycol; and metal catalysts, e.g., tin, bismuth, lead, etc.

This catalyst may be any in the art. In one embodiment, the isocyanate catalyst is an amine catalyst. In another embodiment, the isocyanate catalyst is an organometallic catalyst.

The isocyanate catalyst may be or include a tin catalyst. Suitable tin catalysts include, but are not limited to, tin(II) salts of organic carboxylic acids, e.g. tin(II) acetate, tin(II) octoate, tin(II) ethylhexanoate and tin(II) laurate. In one embodiment, the isocyanate catalyst is or includes dibutyltin dilaurate, which is a dialkyltin(IV) salt of an organic carboxylic acid. Specific examples of non-limiting isocyanate catalysts are commercially available from Air Products and Chemicals, Inc. of Allentown, Pa., under the trademark DABCO®. The isocyanate catalyst can also include other dialkyltin(IV) salts of organic carboxylic acids, such as dibutyltin diacetate, dibutyltin maleate and dioctyltin diacetate.

Examples of other suitable but non-limiting isocyanate catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable but non-limiting isocyanate catalysts include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable but non-limiting isocyanate catalysts include dimethylaminoethanol, dimethylaminoethoxyethanol, triethylamine, N,N,N',N'-tetramethylethylenediamine, N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino)propylimidazole, and combinations thereof. In various embodiments, the isocyanate catalyst is commercially available from Air Products and Chemicals, Inc. under the trademark POLYCAT®. The isocyanate catalyst may include any combination of one or more of the aforementioned catalysts.

In still other embodiments, the catalyst is chosen from DABCO TMR, DABCO TMR-2, DABCO HE, DABCO 8154, PC CAT DBU TA 1, PC CAT Q1, Polycat SA-1, Polycat SA-102, salted forms, and/or combinations thereof.

In other embodiments, the catalyst is chosen from dibutyltin dilaurate, dibutyltin oxide (e.g. as a liquid solution in $C_8$-$C_{10}$ phthalate), dibutyltin dilaurylmercaptide, dibutyltin bis(2-ethylhexylthioglycolate), dimethyltin dilaurylmercaptide, diomethyltin dineodecanoate, dimethyltin dioleate, dimethylti n bis(2-ethylhexylthioglycoate), dioctyltin dilaurate, dibutyltin bis(2-ethylhexoate), stannous octoate, stannous oleate, dibutyltin dimaleate, dioctyltin dimaleate, dibutyitin maleate, dibutyltin mercaptopropionate, dibutyltin bis (isoodyithioglycolate), dibutyltin diacetate, dioctyltin oxide mixture, dioctyltin oxide, dibutyltin diisooctoate, dibutyltin dineodecanoate, dibutyltin carboxylate, dioctyitin carboxylate, and combinations thereof.

The isocyanate catalyst can be utilized in various amounts. For example, in various embodiments, the isocyanate catalyst is utilized in an amount of from 0.0001 to 10, from 0.0001 to 5, from 5 to 10, weight percent based on a total weight percent of reactants or the isocyanate or any other value or range of values therebetween. In other embodiments, the isocyanate catalyst is used in amounts of from 0.001 to 1, weight percent based on a total weight percent of reactants or the isocyanate or any other value or range of values therebetween. Typically, an amount of catalyst used depends on a temperature of the process. For example, at 150° F. (~65.5° C.), 0.0001% may be utilized while at room temperature 5-10% may be utilized.

Additional additives may also be used and include, but are not limited to, anti-foaming agents, processing additives, plasticizers, chain terminators, surface-active agents, flame retardants, anti-oxidants, water scavengers, fumed silicas, dyes or pigments, ultraviolet light stabilizers, fillers, thixotropic agents, silicones, amines, transition metals, and combinations thereof. The additive may be included in any amount as desired by those of skill in the art.

Method of Forming the Composite Article:

This disclosure also provides a method of forming the composite article (10). The method includes the steps of providing the first layer (14), providing the at least one (meth)acrylate and the organoborane initiator, providing the epoxide composition, disposing the at least one (meth)acrylate and the organoborane initiator on the first layer (14), polymerizing the at least one (meth)acrylate in the presence of the organoborane initiator to form the poly(meth)acrylate layer (16) that includes a poly(meth)acrylate and that is disposed on and in direct contact with the first layer (14), disposing the epoxide composition on the poly(meth)acrylate layer (16), and curing the epoxide composition to form the epoxide layer (18) that includes the epoxide and that is disposed on and in direct contact with the poly(meth)acrylate layer (16). Any one or more of the aforementioned steps of providing may be any known in the art. For example, any one or more of the compositions may be provided or supplied in individual components and/or as combinations of one or more components. Any one or more of the steps of disposing may be further defined as applying, spraying, pouring, placing, brushing, or coating, etc. The components of any one or more of the compositions may be disposed with, or independently from, any one or more other components.

In one embodiment, the step of providing the first layer (14) is further defined as providing the first layer (14) that is already disposed on a pipe (12). In such an embodiment, the first layer (14) can be used "in-situ" to form the bilayer coating (28) directly on the pipe (12). Alternatively, the step of providing the first layer (14) may be further defined as providing the first layer (14) independently from the pipe (12). In other words, the first layer (14) may be provided and used independently from the pipe. In fact, the pipe (12) is not at all required in the method. The first layer (14) may be provided and used to form any of the embodiments of the bilayer coating (28) and/or composite article (10).

The individual components of any of the aforementioned compositions may be contacted in a spray device. The spray device may include a hose and container compartments. The components may then be sprayed. The poly(meth)acrylate and/or epoxide may be fully reacted upon spraying. The components may be separate immediately before they are contacted at a nozzle of the spray device. The components may then be together sprayed, e.g. onto the subsea structure (26). Spraying typically results in a uniform, complete, and defect-free layer. For example, the layer is typically even and unbroken. The layer also typically has adequate thickness and acceptable integrity. Spraying also typically results in a thinner and more consistent layer as compared to other techniques. Spraying permits a continuous manufacturing process. Spray temperature is typically selected by one known in the art.

Figure 1:
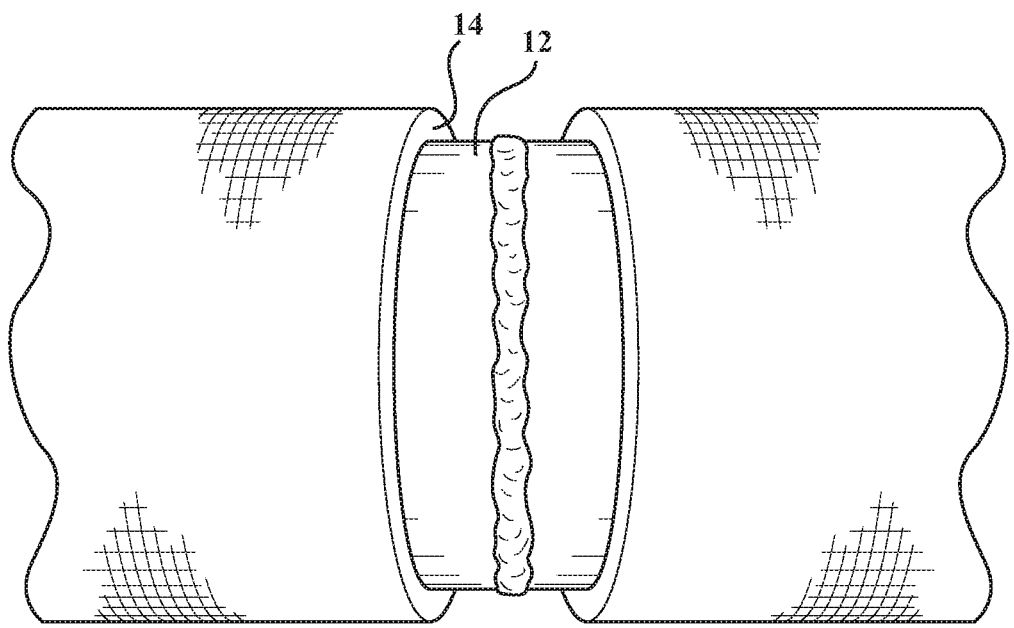
FIG. 1 is perspective view of a subsea pipe that includes a first layer including a low surface energy polymer.
Figure 2:
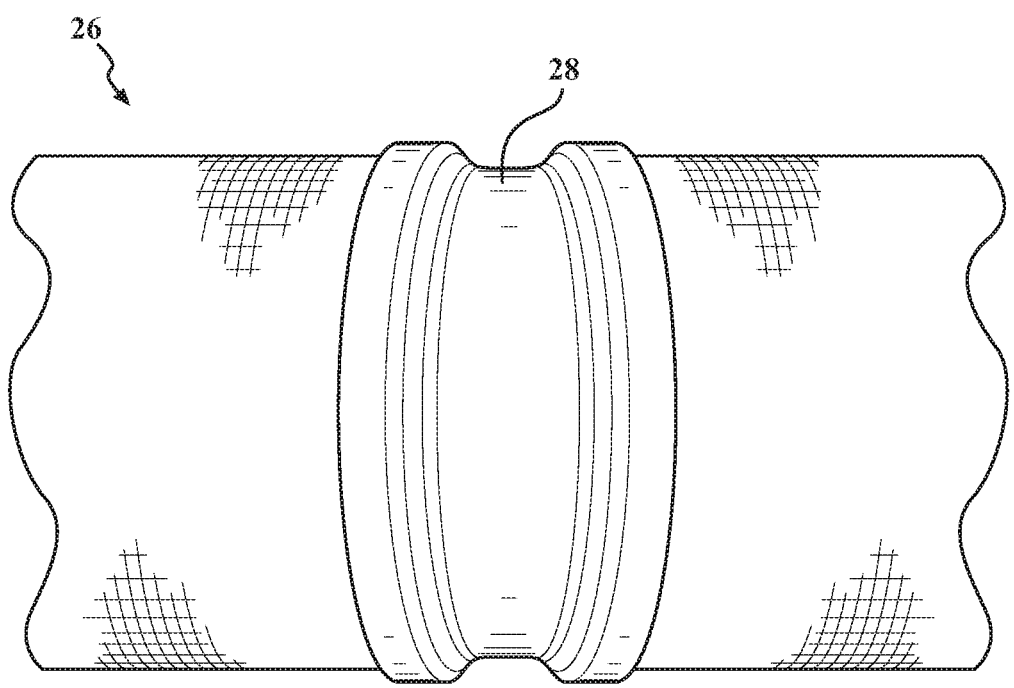
FIG. 2 is a perspective view of a subsea structure that includes one embodiment of the bilayer coating of this disclosure.

Subsea Structure:

The composite article (10) may be further defined as a patch, film, covering, multilayer film or coating, etc, e.g. as shown in FIG. 2. In various embodiments, the composite article (10) is used as a patch on/in a subsea structure (26) such as a structure for use during offshore oil and gas exploration endeavors, as shown, e.g. in FIG. 1.

This disclosure provides a subsea structure (26) including a pipe (12) having a length, a first layer (14) disposed on the pipe (12) and including the low surface energy polymer, and a bi-layer coating (28) disposed on and in direct contact with the first layer (14). The pipe (12) is not limited in composition and may be or include metal, polymers, or combinations thereof. The bi-layer coating (28) includes the poly (meth)acrylate layer (16) disposed on and in direct contact with the first layer (14) and the epoxide layer (18) disposed on and in direct contact with the poly(meth)acrylate layer (16), wherein the bi-layer coating (28) has a pull-off strength of greater than zero pli measured between the poly(meth) acrylate layer (16) and the epoxide layer (18) using ASTM D4541. In one embodiment, the first layer (14) includes a first section and a second section, wherein the first section is spaced apart from the second section along the length of the pipe (12) and the bi-layer coating (28) is disposed between said first and second sections, e.g. as shown in FIG. 2.

Non-limiting examples of suitable subsea structures (26) include pipes (12), flowlines, pipelines, manifolds, pipeline end terminators, pipeline end manifolds, risers, field joints, other joints, jumpers, pipe pigs, bend restrictors, bend stiffeners or christmas trees. A christmas tree is a type of structure well known in the offshore oil and gas exploration field. It is to be appreciated that other structures not described herein may also be suitable for the purposes of the present disclosure. The subsea structure (26) may be a pipe (12) having a diameter of about 12 to about 18 inches diameter, wherein 1 inch is equal to 2.54 centimeters. The diameter of a subsea pipe (12) structure is not limited, and may range from a few inches, in the case of a flowline, to several feet. The length of the pipe (12) is also not limited. In various embodiments, a bi-layer coating (28) is utilized in the subsea structure (26) wherein the bi-layer coating (28) is, consists of, or consists essentially of, the poly(meth)acrylate layer (16), the epoxide layer (18), and the polyurethane elastomer layer. For example, the first layer (14) may be disposed on the pipe (12) and the bi-layer coating (28) may be disposed on the first layer (14).

In various embodiments, the bi-layer coating (28) insulates a portion of the subsea structure (26). For example, the bi-layer coating (28) may form an exterior partial or full coating having a thickness on the structure intended for subsea applications. The thickness of the bi-layer coating (28) may be half an inch thick, wherein 1 inch is equal to 2.54 centimeters. Alternatively, the thickness of the bi-layer coating (28) may be up to one foot thick. In one embodiment, the thickness of the polyurethane elastomer layer may be about four inches, wherein 1 inch is equal to 2.54 centimeters. In another embodiment, the thickness of the polyurethane elastomer layer may be about six inches, wherein 1 inch is equal to 2.54 centimeters. In yet another embodiment, the thickness of the polyurethane elastomer layer may be about nine inches, wherein 1 inch is equal to 2.54 centimeters.

In addition, the bi-layer coating (28) may insulate petroleum fuels, such as oil and/or gas, that flow through the subsea structure (26). The bi-layer coating (28) may coat a large enough surface area of a subsea structure (26) so that the bi-layer coating (28) can effectively insulate the subsea structure (26) and the petroleum fuels, such as oil, flowing within the subsea structure (26). When the petroleum fuel, such as oil, is collected from about one to two miles beneath the ocean floor, the oil is very hot (e.g., around 130° C.). Seawater at this depth is very cold (e.g., around 4° C.). The bi-layer coating (28) may insulate the oil during transportation from beneath the ocean floor to above the surface of the ocean. The bi-layer coating (28) can insulate the oil so that the vast difference in average seawater temperature and average oil temperature does not substantially affect the integrity of the oil. The bi-layer coating (28) typically maintains a relatively high temperature of the petroleum fuels such that the fuels, such as oil, can easily flow through the subsea structures (26), such as pipes (12) and pipelines. The bi-layer coating (28) typically adequately prevents the fuel (oil) from becoming too cold, and therefore too viscous to flow, due to the temperature of the seawater. The bi-layer coating (28) also typically adequately prevents the oil from forming waxes that detrimentally act to clog the subsea structures (26) and/or from forming hydrates that detrimentally change the nature of the oil and also act to clog the subsea structures (26). The bi-layer coating (28) may be flexible to enable the subsea structure (26) to be manipulated in different ways. For instance, the subsea structure (26) of this disclosure, such as a pipeline, may be dropped off the edge of an oil platform, rig or ship, and maneuvered, by machine or otherwise, through the ocean and into the ocean floor. Also, if any one of the subsea structures (26) is made of an expandable material, such as a metallic material, it may expand due to any one of several factors, including heat. The flexibility of the bi-layer coating (28) typically allows for the expansion, due to, for instance, heat, without becoming delaminated itself. That is, the bi-layer coating (28) can stretch with the expanding subsea structure (26) without deteriorating or delaminating itself. It is to be appreciated that the bi-layer coating (28) can also have applications beyond offshore oil and gas exploration, including, but not limited to, any type of underwater, including fresh water and seawater, applications.

Any one or more of the layers may be formed in-situ on the subsea structure (26). The components of any one or more of the layers may be combined at the time of disposing the components onto the subsea structure (26). For example, the first layer (14) may be disposed on the pipe (12) and the bilayer coating (28) may be formed using the first layer (14) that is already disposed on the pipe (12). Alternatively, the bilayer coating (28) may be formed using the first layer (14) when the first layer (14) is not disposed on the pipe (12) such that the bilayer coating (28) may then be later disposed on the pipe (12).

In other non-limiting embodiments, the contents of U.S. Provisional applications labeled as BASF Docket Numbers: PF75191, PF78507, and PF78550, filed on the same day herewith, are expressly incorporated by reference in their entirety, such that one or more components, reactants, method steps, or articles described therein are expressly contemplated for use herein in those non-limiting embodiments.

EXAMPLES

A series of composite articles are formed according to this disclosure along with a series of comparative articles that are not representative of this disclosure. After formation, the articles are evaluated to determine pull-off strength.

To form the articles, a series of polypropylene plaques are scrubbed and roughened using a green Scotchbrite pad and dishsoap/water. The plaques are then dried in an oven at 65° C. for about 60 minutes. The polypropylene plaques are approximately ⅛ inch thick, 10 inches long and 10 inches wide (i.e., approximately 0.3175 cm thick, 25.4 cm wide and 25.4 cm long).

To form examples of various embodiments of this disclosure, a poly(meth)acrylate composition including 40.6 g of hydroxypropyl methacrylate, 40.6 of butyl acrylate, 3.4 g of acrylic acid, and 3.5 g of triethylborane diaminopropane is applied to polypropylene plaques. The poly(meth)acrylate composition is allowed to cure at room temperature for 18 hours to form a poly(meth)acrylate layer on the polypropylene plaque.

First Examples of this Disclosure

Subsequently, a 2-part epoxide composition is applied to the poly(meth)acrylate layer and allowed to cure to form an epoxide. The 2-part epoxide composition is formed as follows.
Epoxy Prepolymer:
A vessel is charged with 500 g of DER™ 332 liquid epoxy resin and 400 g of Polyetheramine D2000 followed by agitation on a roller until homogenous. The vessel is then placed in a convection oven at 80° C. for 3 days with occasional mixing, followed by 3 hours at 120° C. The epoxy terminated prepolymer is found to be a viscous liquid at 25° C. (approximately 90,000 cPs) with a measurable epoxy equivalent weight of 333 g/epoxide equivalent.
Epoxy Elastomer:
The epoxy prepolymer is added to lidded cups suitable for use in a FlackTek SpeedMixer™ and the sample mixed for 30 seconds at 800 rpm, then mixed at 2350 rpm for 1 minute to remove bubbles and then heated in a 54° C. oven. The Epoxy Prepolymer is (100 g) is blended with monoethanolamine (4.8 g) and triethylene triamine (1.2 g) using the FlakTec SpeedMixer.

This reaction mixture is then poured over the poly(meth) acrylate layer to a thickness of about ¼ inch, wherein 1 inch is equal to 2.54 centimeters. The resultant sample was placed is placed in an over at 60° C. for 6 hours, followed by 80° C. for 2 hours.

Accordingly, these examples are composite articles that include a polypropylene plaque as set forth above (representing the low surface energy polymer), a 0.050 wet film thickness poly(meth)acrylate layer disposed on and in direct contact with the polypropylene plaque, an about ¼" thick epoxide layer disposed on and in direct contact with the poly(meth)acrylate. These examples are labeled as Article 1 in the Table below.

Second Examples of this Disclosure

In additional examples, a 2-part epoxy-polyurethane hybrid composition is applied to the poly(meth)acrylate layer and allowed to cure to form an epoxy-polyurethane hybrid. The 2-part epoxy-polyurethane hybrid composition is formed as follows.

The Epoxy Prepolymer described above (153 g) is blended with 1,4-Butanediol (32.3 g), propylene carbonate (9.6 g), Dabco T-12 (0.1 g), Byk-066 (1 g) and Molsiv 3A (4 g). Then, Lupranate M20 (117.3 g) is added and the reaction mixture blended using a SpeedMixer. This reaction mixture is then poured over the poly(meth)acrylate layer to a thickness of about ¼ inch, wherein 1 inch is equal to 2.54 centimeters. The resultant sample is placed in an oven at 60° C. for 6 hours, followed by 80° C. for 2 hours.

Accordingly, these examples are composite articles that include a polypropylene plaque as set forth above (representing the low surface energy polymer), 0.050 wet film thickness poly(meth)acrylate layer disposed on and in direct contact with the polypropylene plaque, a ¼" thick epoxide layer disposed on and in direct contact with the poly(meth)acrylate. These examples are labeled as Article 2 in the Table below.

Comparative Examples

To form a first set of comparative examples, the 2-part epoxide composition described above is disposed on the aforementioned plaques and allowed to cure to form Comparative Articles that include a 0.050 wet film thickness polypropylene and a ¼" thick epoxide disposed on and in direct contact with the polypropylene. No acrylate layer is present. These examples are labeled as Comp 1 in the Table below.

To form a second set of comparative examples, a ¼" thick epoxy-polyurethane hybrid is formed as described above and is disposed on and in direct contact with the polypropylene. Again, no acrylate layer is present. These examples are labeled as Comp 2 in the Table below.

Subsequently, the plaques are evaluated to determine pull-off strength using a 90° pull-off test of ASTM D4541. The results are set forth below and represent an average of three measurements.

| Plaque | Poly Acrylate | Epoxy Elastomer | Epoxy-PU Hybrid | Pull-Off Strength (pli; ASTM D4541) | Adhesive Failure |
|---|---|---|---|---|---|
| Comp. 1 | No | Yes | No | 0* | 100% Adhesive failure between Epoxy Elastomer and Polypropylene |
| Comp. 2 | No | No | Yes | 0* | 100% Adhesive failure between Hybrid and Polypropylene |
| Art 1 | Yes | Yes | No | 570 | 100% Cohesive failure of the Poly(meth)acrylate |
| Art 2 | Yes | No | Yes | 1192 | 80% Cohesive failure of the Poly(meth)acrylate and 20% failure of the Hybrid |

*Adhesion is too weak to evaluate and therefore is equivalent to zero pli adhesion.

The data set forth above demonstrates that the presence of the polyacrylate layer allows strong adhesion of the epoxy and PU-epoxy hybrid elastomers to polypropylene which do not otherwise adhere.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A composite article having increased pull-off strength and comprising:
   A. a first layer comprising a low surface energy polymer;
   B. a poly(meth)acrylate layer disposed on and in direct contact with said first layer, wherein said poly(meth)acrylate layer comprises a poly(meth)acrylate that comprises the reaction product of at least one (meth)acrylate polymerized in the presence of an organoborane initiator; and
   C. an epoxide layer disposed on and in direct contact with said poly(meth)acrylate layer, wherein said epoxide layer comprises an epoxy-polyurethane hybrid;
   wherein said composite article has a pull-off strength of greater than zero pli measured using ASTM D4541.

2. The composite article of claim 1 wherein said epoxy-polyurethane hybrid is the reaction product of an isocyanate component and an epoxy compound.

3. The composite article of claim 1 wherein said epoxide is further defined as an epoxide elastomer that is the polymerization product of an epoxy compound.

4. The composite article of claim 1 having a pull-off strength of at least 800 pli measured between said epoxide layer and said poly(meth)acrylate layer using ASTM D4541.

5. The composite article of claim 1 wherein said first layer is a first outermost layer.

6. The composite article of claim 1 wherein said epoxide layer is a second outermost layer.

7. The composite article of claim 1 wherein said poly(meth)acrylate is covalently bonded to said low surface energy polymer.

8. The composite article of claim 1 wherein said low surface energy polymer is chosen from polypropylene, polyethylene, and combinations thereof.

9. The composite article of claim 1 wherein said poly(meth)acrylate is a self-polymerization product of at least one C1-C20 alkyl acrylate or methacrylate.

10. The composite article of claim 1 wherein said organoborane initiator is chosen from organoborane-amine complexes, organoborane-azole complexes, organoborane-amidine complexes, organoborane-heterocyclic nitrogen complexes, amido-organoborate complexes, and combinations thereof.

11. A method of forming a composite article having increased pull-off strength, said method comprising the steps of:
    A. providing a first layer of the composite article comprising a low surface energy polymer;
    B. providing at least one (meth)acrylate and an organoborane initiator;
    C. providing an epoxide composition;
    D. disposing the at least one (meth)acrylate and the organoborane initiator on the first layer;
    E. polymerizing the at least one (meth)acrylate in the presence of the organoborane initiator to form a poly(meth)acrylate layer that comprises a poly(meth)acrylate and that is disposed on and in direct contact with the first layer;
    F. disposing the epoxide composition on the poly(meth)acrylate layer; and
    G. curing the epoxide composition to form an epoxide layer that comprises an epoxy-polyurethane hybrid and that is disposed on and in direct contact with the poly(meth)acrylate layer,
    wherein the composite article has a pull-off strength of greater than zero pli measured using ASTM D4541.

12. The method of claim 11 wherein the step of polymerizing the at least one (meth)acrylate occurs at a temperature of from 20° C. to 40° C.

13. A subsea structure comprising:
    A. a pipe having a length;
    B. a first layer disposed on said pipe and comprising a low surface energy polymer;

C. a bi-layer coating disposed on and in direct contact with said first layer, wherein said bi-layer coating comprises;
   (1) a poly(meth)acrylate layer disposed on and in direct contact with said first layer, wherein said poly(meth)acrylate layer comprises a poly(meth)acrylate comprising the reaction product of at least one (meth)acrylate polymerized in the presence of an organoborane initiator; and
   (2) an epoxide layer disposed on and in direct contact with said poly(meth)acrylate layer, wherein said epoxide layer comprises an epoxy-polyurethane hybrid;
   wherein said bi-layer coating has a pull-off strength of greater than zero pli measured using ASTM D4541.

14. A method of forming the subsea structure of claim 13, said method comprising the steps of providing the pipe, providing the first layer, providing the at least one (meth)acrylate and the organoborane initiator, providing an epoxide composition, disposing the at least one (meth)acrylate and the organoborane initiator on the first layer, polymerizing the at least one (meth)acrylate in the presence of the organoborane initiator to form the poly(meth)acrylate layer, disposing the epoxide composition on the poly(meth)acrylate layer, and curing the epoxide composition to form the epoxide layer and the bi-layer coating.

* * * * *